C. HESS.
GANG PLOW.
No. 75,268. Patented Mar. 10, 1868.
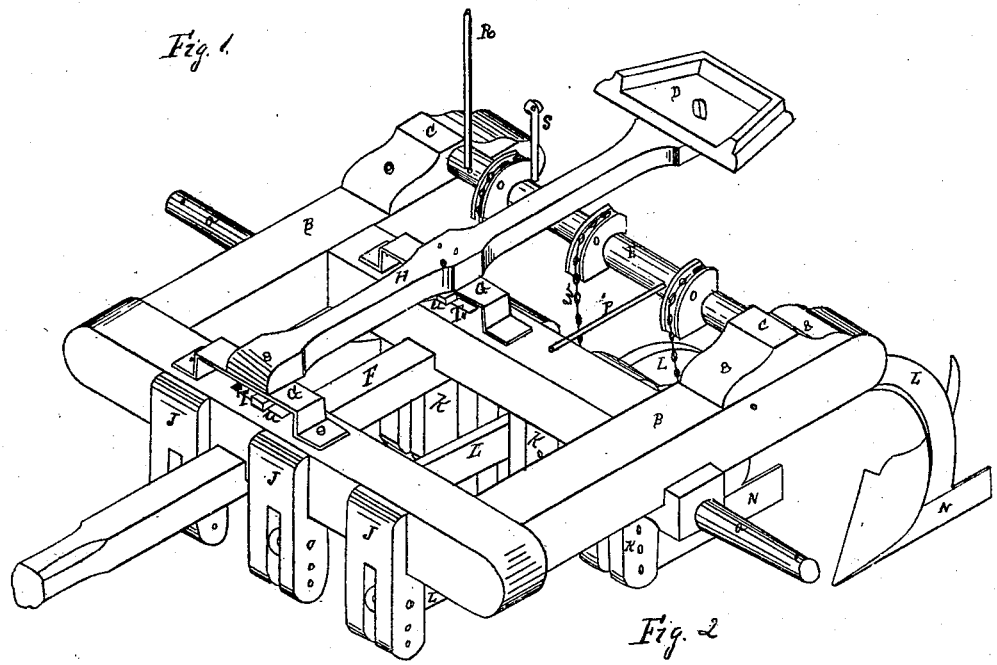
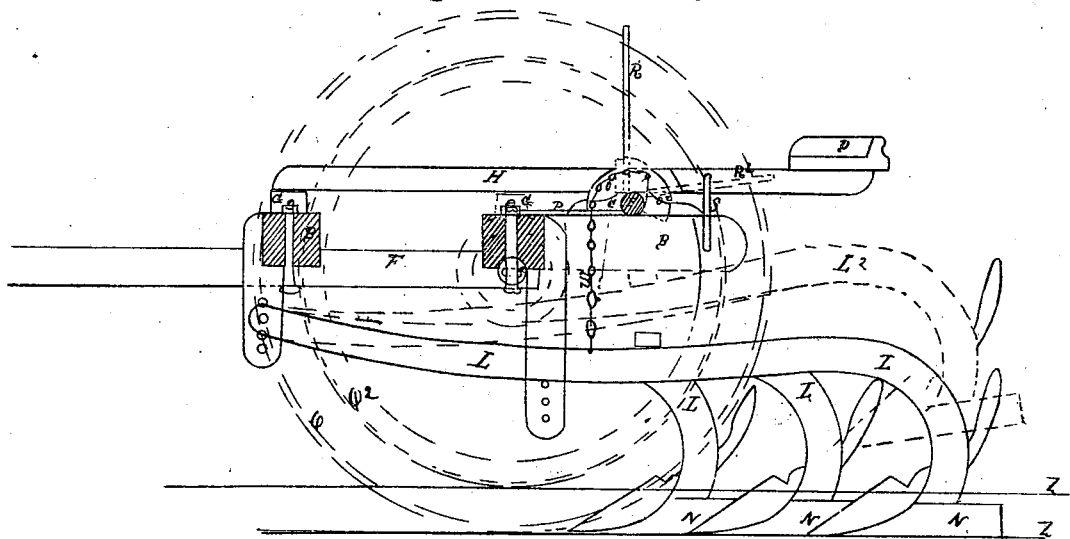

United States Patent Office.

CHARLES HESS, OF LYONS CITY, IOWA.

Letters Patent No. 75,268, dated March 10, 1868.

---

IMPROVEMENT IN GANG-PLOUGHS.

---

The Schedule referred to in these Letters Patent and making part of the same.

---

TO ALL WHOM IT MAY CONCERN:

Be it known that I, CHARLES HESS, of the city of Lyons, in the county of Clinton, and State of Iowa, have invented certain new and useful Improvements in Gang-Ploughs; and I do hereby declare that the following is a full, clear, and exact description of the construction and operation of the same, reference being had to the accompanying drawings, and to the letters of reference marked thereon.

The nature of my invention consists in so constructing and arranging the implement that each plough has a beam of its own, and is independent of any other plough; also in so constructing that one, two, or three, or more ploughs may be used at the same time; also in so adjusting the parts that all the ploughs may be raised out of the ground at once, or only one at a time; also in so arranging the tongue and frame that it may be adjusted to fit the draught.

In order that others may more fully understand, I will carefully describe the construction and operation of the same.

In the drawings, the same figures and letters refer to same parts.

Figure 1 is a perspective view, with wheels off.

Figure 2, a side elevation and section, showing the attachments.

A represents the axle for wheels; B represents the frame; C represents the socket for roller E; D represents the seat; E represents the roller for raising ploughs; F represents the tongue; G represents the rests for seat-beam; H represents the beam for seat; J represents the guides for ploughs and draught-head; K represents the guides for plough-beams; L represents the plough-beams; N represents the plough; O represents the cam for raising plough; P represents the stop-rod to keep roller E from turning down; R represents the lever to raise ploughs; S represents the catch to hold lever R down; T represents the slot in frame to adjust the tongue; U represents the bolts to confine the tongue; W represents the chains to attach plough-beam to cam; Z represents the top of the ground; $Z^2$ represents the depth of ploughing; $O^1$ represents the large wheel that runs in furrow; $O^2$ represents the small wheel that runs on land. I construct the frame B of any suitable material, fastening to it the draught-heads J and the guide-pieces K.

Now, to operate this plough, I attach the beam of the plough I, to the draught-head J, each plough having a separate head and guide, thus allowing each plough to work freely. To regulate the depth of the plough, I raise or lower the beam in the head J. To regulate the land, I adjust the tongue by moving it on the under side of the frame, and firmly holding it with bolts U. To raise the ploughs out of the ground, grasp the lever R and bring it down to catch S. It will turn the roller E, to which are attached the cams O, which wind up the chain, bringing the plough up in position, as $L^2$, fig. 2. To raise one or two, and leave the other in, cast the chain off of the cam, and the moving of the lever will not operate it. Thus one or more ploughs can be left in the ground.

What I claim as my invention, and desire to secure by Letters Patent, is—

1. The slot T in the head-piece, and axle to adjust the tongue.
2. The iron beams when used in a gang-plough.
3. The combination and arrangement of the parts, when constructed and used as above set forth.

CHARLES HESS.

Witnesses:
 W. W. SANBORN,
 A. R. COTTON.